US012627788B2

(12) United States Patent
Dell

(10) Patent No.: US 12,627,788 B2
(45) Date of Patent: May 12, 2026

(54) DISPLAY ASSEMBLY ARRANGED TO CREATE A PERCEPTION OF A THREE-DIMENSIONAL SCENE

(71) Applicant: AXIOM HOLOGRAPHICS PTY LTD, Brisbane (AU)

(72) Inventor: Bruce Robert Dell, Brisbane (AU)

(73) Assignee: AXIOM HOLOGRAPHICS PTY LTD, Brisbane (AU)

( * ) Notice: Subject to any disclaimer, the term of this patent is extended or adjusted under 35 U.S.C. 154(b) by 8 days.

(21) Appl. No.: 18/575,365

(22) PCT Filed: Jun. 28, 2022

(86) PCT No.: PCT/AU2022/050659
§ 371 (c)(1),
(2) Date: Dec. 29, 2023

(87) PCT Pub. No.: WO2023/272342
PCT Pub. Date: Jan. 5, 2023

(65) Prior Publication Data
US 2024/0297976 A1    Sep. 5, 2024

(30) Foreign Application Priority Data

Jun. 29, 2021    (AU) ................................ 2021901966

(51) Int. Cl.
*H04N 13/346*        (2018.01)
*G02B 30/35*         (2020.01)
(Continued)

(52) U.S. Cl.
CPC ........... *H04N 13/346* (2018.05); *G02B 30/35* (2020.01); *H04N 13/302* (2018.05); *H04N 2013/403* (2018.05)

(58) Field of Classification Search
CPC .. G02B 27/0093; G02B 30/35; H04N 13/302; H04N 13/346; H04N 13/395; H04N 2013/403
(Continued)

(56) References Cited

U.S. PATENT DOCUMENTS

| | | |
|---|---|---|
| 2002/0096985 A1 | 7/2002 | Hazzard |
| 2010/0177403 A1* | 7/2010 | Dolgoff ................. G09G 3/001 |
| | | 359/629 |
| 2018/0341171 A1* | 11/2018 | Choi ...................... G03B 21/56 |

FOREIGN PATENT DOCUMENTS

| | | | | |
|---|---|---|---|---|
| FR | 3016974 A1 * | 7/2015 | ............. | G02B 27/01 |
| KR | 20080103407 A | 11/2008 | | |

(Continued)

OTHER PUBLICATIONS

Arnaud et al(Machine translation of FR 3016974 A1) (Year: 2015).*
(Continued)

*Primary Examiner* — Christopher S Kelley
*Assistant Examiner* — Ana Picon-Feliciano
(74) *Attorney, Agent, or Firm* — Workman Nydegger

(57) ABSTRACT

A display assembly includes: a scene display screen; a privacy screen mounted over the scene display screen; a first mirror having a reflection side ("the first reflection side") and a transmission side ("the first transmission side"). The first reflection side is mounted at an angle to the scene display screen for illumination; a background display screen faces the first transmission side for illumination thereof; and a housing arranged about the scene display screen, background display screen and first mirror for reducing ambient light within the housing including an opening for viewing of the reflection side of the first mirror therethrough. An image generation assembly is coupled to the scene display screen for producing a moving scene image thereon. The observer views the background display screen and the scene display
(Continued)

screen simultaneously when viewing the reflection side of the first mirror and the privacy screen prevents viewing a secondary scene image.

15 Claims, 8 Drawing Sheets

(51) Int. Cl.
  *H04N 13/30*        (2018.01)
  *H04N 13/302*       (2018.01)
(58) Field of Classification Search
  USPC ......................................................... 348/51
  See application file for complete search history.

(56)                    References Cited

FOREIGN PATENT DOCUMENTS

KR      20100112823  A     10/2010
KR      20160143623  A     12/2016
WO       2019014718  A1     1/2019

OTHER PUBLICATIONS

3M, "Privacy and Screen Protectors", https://www.3m.com/3M/en_US/privacy-screen-protectors-US, retrieved from the Wayback Machine at Jun. 12, 2021, 12 pages.

Dolgoff, Eugene, "Real-Depth imaging: a new 3D imaging technology with inexpensive direct-view (no glasses) video and other applications", Proceedings of SPIE, Stereoscopic Displays and Virtual Reality Systems IV, May 15, 1997, pp. 282-288, vol. 3012.

Powell, John M, "Scenery Display Mirror Collimation", http://mikesflightdeck.com/scenery_display/mirror_collimation.html, Mike's Flight Deck, retrieved from the Wayback Machine at Dec. 1, 2021, 4 pages.

International Search Report from corresponding PCT Application No. PCT/AU2022/050659, Oct. 4, 2022.

Extended European Search Report from Corresponding European Patent Application No. EP22831060.3, Aug. 8, 2024.

* cited by examiner

Foreground
Display
Screen

51

27

Scene
Display
Screen

3

33

Shadow
Display Screen

53

29

Background
Display
Screen

28

11

DISPLAY ASSEMBLY ARRANGED TO CREATE A PERCEPTION OF A THREE-DIMENSIONAL SCENE

RELATED APPLICATIONS

The present invention claims priority from Australian provisional patent application No. 2021901966 filed 29 Jun. 2021, the contents of which is hereby incorporated by reference in its entirety.

TECHNICAL FIELD

The present invention relates to methods and apparatus for creating a visual display that appears to a human viewer as a three-dimensional (3D) scene such as an object or group of objects. Such displays are eye catching and may be used for advertising and marketing purposes as well as in other applications.

BACKGROUND

Any references to methods, apparatus or documents of the prior art are not to be taken as constituting any evidence or admission that they formed, or form part of the common general knowledge.

Humans are drawn to three dimensional effects and such effects are eye catching and attention gaining so that they are useful for a multitude of purposes where it is advantageous to be able to attract the gaze of people. Such purposes include advertising and marketing displays.

Many systems that create a perception of a three-dimensional object require special apparatus for tracking the position of the viewer and that the viewer wears stereoscopic glasses. For example, in PCT/AU2018/050754 by the present Inventor, there is described a virtual object display system which allows two different users to simultaneously view the same virtual object from different positions. That system makes use of viewer tracking and stereoscopic projection systems.

In contrast, it would be desirable if a simple visual effect assembly were provided that does not require the viewer to be tracked and which does not require the viewer to wear special glasses.

It is an object of the present invention to provide a three-dimensional visual effect assembly for a displaying a scene that appears to be three-dimensional and which does not require the use of special glasses, for a user to form a perception that the scene is three dimensional.

SUMMARY OF THE INVENTION

According to a first aspect of the present invention there is provided a display assembly for eliciting a perception of a three-dimensional (3D) scene in an observer, the display assembly comprising:
  a scene display screen;
  a privacy screen mounted over the scene display screen for reducing viewing angle thereof;
  a first mirror having a reflection side ("the first reflection side") and a transmission side ("the first transmission side"), the first reflection side mounted at an angle to the scene display screen for illumination thereby;
  a background display screen facing the first transmission side for illumination thereof; and
  a housing arranged about the scene display screen, background display screen and first mirror for reducing ambient light within the housing including an opening for viewing of the reflection side of the first mirror therethrough; and
  an image generation assembly coupled to the scene display screen for producing a moving scene image thereon;
  wherein the observer views the background display screen and the scene display screen simultaneously when viewing the reflection side of the first mirror and wherein the privacy screen prevents viewing by the observer of a secondary scene image.

In embodiment the first reflection side is mounted at 45±3 degrees to the scene display screen or preferably at 45 degrees.

In an embodiment the background display screen is mounted at 90±3 degrees to the scene display screen or preferably at 90 degrees.

In an embodiment the display assembly includes a second mirror having a reflection side ("second reflection side") and a transmission side ("second transmission side"), wherein the second reflection side reflects light transmitted through the first transmission side from the background display screen through the opening for viewing of the background display screen by the observer.

In an embodiment the second reflection side is mounted at 90±3 degrees to the first reflection side or preferably at 90 degrees.

In an embodiment the display assembly includes a shadow display screen.

In an embodiment the shadow display screen is mounted opposite the scene display screen.

In an embodiment an edge portion of the shadow display screen overlaps an edge portion of the scene display screen.

In an embodiment the shadow display screen is located adjacent the first transmission side.

In an embodiment the image generation assembly is configured to produce a shadow image wherein the shadow image corresponds to a shadow of the virtual moving scene image.

In an embodiment the display assembly includes a foreground display screen.

In an embodiment the foreground display screen is located adjacent the second transmission side.

In an embodiment the image generation assembly is configured to produce a foreground image for display by the foreground display screen.

In an embodiment the virtual moving scene image rotates at a frequency of between three to six times per second.

In an embodiment the virtual moving scene image rotates at a frequency of four times per second.

According to a further aspect of the present invention there is provided a display assembly including at least one partially silvered mirror, a background display screen and a scene display screen wherein the background display screen illuminates a transmission side of the mirror and the scene display screen illuminates a reflection side of the mirror wherein rays from the scene display screen and the background display screen are directed toward a viewing position for simultaneous viewing by an observer.

For example, the viewing position may correspond to an opening of the display assembly According to a further aspect of the present invention there is provided a method for creating a perception of a 3D object in an observer, the method comprising:
  displaying to the observer a reflection of a 2D moving scene image corresponding to the 3D object with a reflective side of a partially silvered mirror;

displaying a background image at a location behind the partially silvered mirror, relative to the observer, wherein the background image is transmitted through a transmission side of the partially silvered mirror to the observer; and limiting a viewing range of the observer to see the moving 2D display to thereby prevent formation of a secondary image of the moving 2D display.

In an embodiment the method comprises displaying a shadow image corresponding to the moving 2D display on a shadow display screen and reflecting the shadow image for viewing on an apparent plane at ninety degrees to an apparent viewing plane of the moving scene image In an embodiment the method comprises displaying a foreground image in front of the moving scene image.

According to another aspect of the present invention there is provided a display assembly for eliciting a perception of a three-dimensional (3D) scene in an observer, the display assembly comprising at least one partially silvered mirror, a scene display screen for presenting a moving scene image via the partially silvered mirror and a viewing range limiter, such as a privacy screen, over the moving scene display screen to prevent viewing of a secondary image corresponding to the virtual moving scene image.

According to a further aspect of the present invention there is provided a display assembly for eliciting a perception of a three-dimensional (3D) scene in an observer, the display assembly comprising a useful combination of previously described features mentioned in the preceding paragraphs of this Summary.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figures 1, 2:
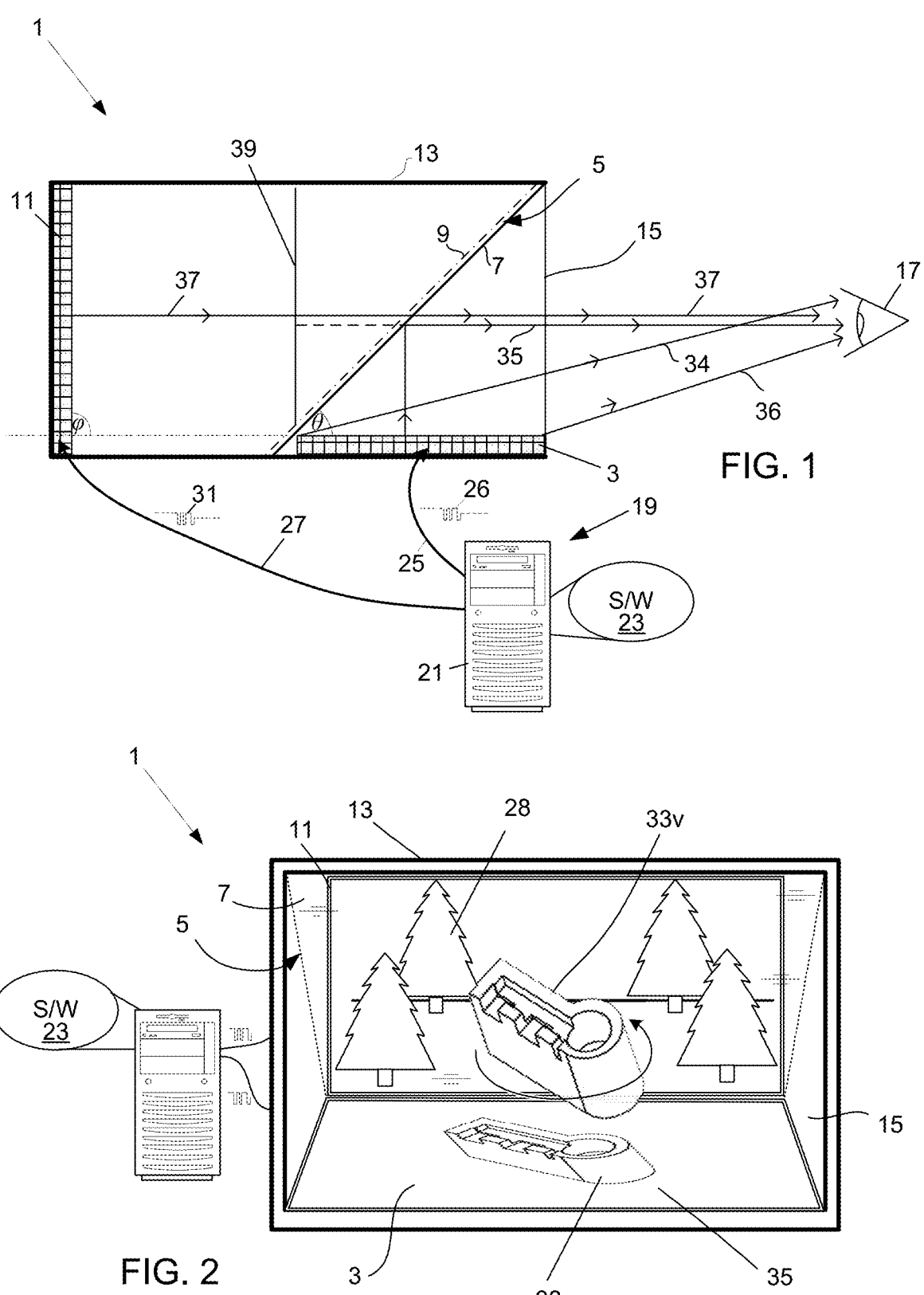
FIG. 1 is a cross-sectional side view of an early version display assembly, shown in use, that the Inventor conceived whilst developing aspects and embodiments of the invention that will be subsequently described.
FIG. 2 is a front view of the early version display assembly of FIG. 1, in use.

Referring now to FIGS. 1 and 2, there is shown a side, cutaway view and a front view, of an early version of a display assembly, being an early display assembly 1 that the Inventor devised whilst seeking to arrive at the preferred embodiment of the invention that will subsequently be described. Early display assembly 1 includes a scene display screen 3, which is typically a flat screen "monitor" such as a backlit LED screen or an OLED screen for example. It will be realised that other types of display screen might also be used such as a rear projection screen.

Early display assembly 1 includes a first mirror 5 that is planar and which has a reflection side 7 ("first reflection side") and a transmission side 9 ("first transmission side") opposite the first reflection side 7. The first mirror 5 is partially silvered and preferably 70% reflective and 30% transmissive. Such a mirror is sometimes referred to as a "beam splitter".

The first reflection side 7 is mounted at an angle $\theta=45$ degrees or thereabout to the scene display screen 3 so that when it is operating, the scene display screen 3 illuminates the first reflection side 7 of Mirror 5.

A background display screen 11 is mounted at an angle $\varphi=90$ degrees, or thereabout, to the scene display screen 3. The background display screen 11 faces the first transmission side 9 of the mirror 5 so that when the background display screen 11 is operating it illuminates the first transmission side 9. Light from the background display screen 11 passes through the mirror 5 as indicated by ray 37. Whilst it is preferred that the background display screen be an active display, such as an electronic monitor or tv screen, it could be an image painted on a screen such as a canvas, for example, that is lit by a light source so that it is visible to the viewer.

A housing 13 is arranged about the scene display screen 3, background display screen 11 and first mirror 5. The housing 13 reduces ambient light from the external environment from passing into the housing so that images formed by screens 3, 11 are easily seen by observer 17. It will be realized that if the display assembly is used only at night or in some other low ambient light environment then a housing may be unnecessary. Housing 13 includes an opening 15. An externally located observer 17 is able to view the first reflection side 7 through the opening 15.

An image generation assembly 19 is coupled to the scene display screen 3 and to the background display screen 11. The image generation assembly 19 may comprise a computer 21 that is programmed with software 23 for producing a moving scene image 33 on scene display screen 3 and a background image 28 on the background display screen 11. The image generation assembly 19 is coupled to the scene display screen 3 and to the background display screen 11 by respective video cables 25, 27.

In use, the image generation assembly 19 produces video signals 26, 31 that are transmitted via video cables 25, 27 to the scene display screen 3 and the background display screen 11, which respectively present the moving scene image 33 and the background image 28. The moving scene image 33 will preferably comprises a moving picture, that is two-dimensional, of one or more objects that are intended to be perceived by the observer 17 as being three-dimensional.

The observer 17 views the background display screen 11 and the scene display screen 3 simultaneously through the opening 15 of the housing 13 and thus sees a virtual moving scene image 33v corresponding to the moving scene image 33 on a scene apparent plane 39. To that end the object is shown moving, preferably rotating and/or zooming and/or translating so that the viewer does not have time to check for cues, such as gauging depth of the object by using motion parallax, that might lead them to realize that the image that is being presented is actually a two-dimensional image produced on the flat scene display screen 3. In a preferred embodiment of the invention the moving scene image 33 rotates at a frequency of between three to six times per second, for example four times per second.

The observer 17 also sees a background image 28 behind the virtual moving scene image 33v on the background display screen 11. The different apparent depths of the background image 28 and the virtual moving scene image 33v add to a perception by the observer 17 that that the moving scene image 33v is a 3D object.

Observer 17 views the scene display screen 3 via the first reflection side 7 of first mirror 5 as indicated by ray 35 and consequently sees the virtual moving scene image 33v, that appears to be located behind the mirror 5 (relative to observer 17) on the scene apparent plane 39. Observer 17 views the background image 28 that is presented by the background display screen 11 due to transmission of light from the background display screen 11 through the first transmission side 6, as indicated by ray 37.

In addition to viewing the virtual moving scene image 33v, on the scene apparent plane 39, the observer 17 also sees the moving scene image 33 directly from display screen 3 as indicated by rays 34, 36 in FIG. 1.

FIG. 2 depicts the view seen by the observer 17 through opening 15 of the housing 13. It can be seen in FIG. 2 that observer 17 sees the virtual moving scene image 33v on the scene apparent plane 39, which is intended and desirable, but also, as previously mentioned, sees the moving scene 33 directly as an unwanted "secondary scene image". The observer's viewing of the moving scene 33 i.e., the unwanted secondary scene image, posed a problem because it largely prevented the perception by observer 17 of the virtual moving scene image 33v being a 3D object. Consequently, the early version early display assembly 1 was less successful in eliciting a perception of a 3D object in the observer than the Inventor had hoped for.

The Inventor considered that one way of addressing the problem of the viewing of the secondary scene image in the form of moving scene 33, would be to raise the housing 13 to a sufficient height, that the observer 17 could not directly view the scene display screen 3. However, such an approach would unduly limit the vertical range of positions from which the observer could view the scene apparent plane 39 and the background display 11.

After much thought the Inventor decided to investigate limiting the angular range of rays emanating from the scene display screen 3 so that the rays would substantially only illuminate the first reflective side of the mirror 5.

One technique for reducing divergence of rays from a display, that has been used in flight simulators for example, is to use a parabolic mirror to collimate light from a monitor. Such a technique is described at http://mikesflightdeck.com/scenery_display/mirror_collimation.html (retrieved 8 Jun. 2021) for example.

However, mirror collimation requires a large parabolic mirror, which is expensive and difficult to arrange relative to a monitor and which would add to the bulk of the display apparatus.

The Inventor then considered using a privacy screen across opening 15 to prevent the rays 34, 36 from the scene display screen 3 reaching the observer 17. Privacy screens are designed to prevent visual hacking (i.e., surreptitious viewing of a person's computer screen, for example over their shoulder, to illicitly obtain private information). Privacy screens work by limiting the viewing angle of the screen on which they are overlaid. However, it was realized that a privacy screen across the opening 15 that would limit the viewing angle of light from the first reflection side 7 and also the viewing angle of light from background scene display 11.

Figure 3:
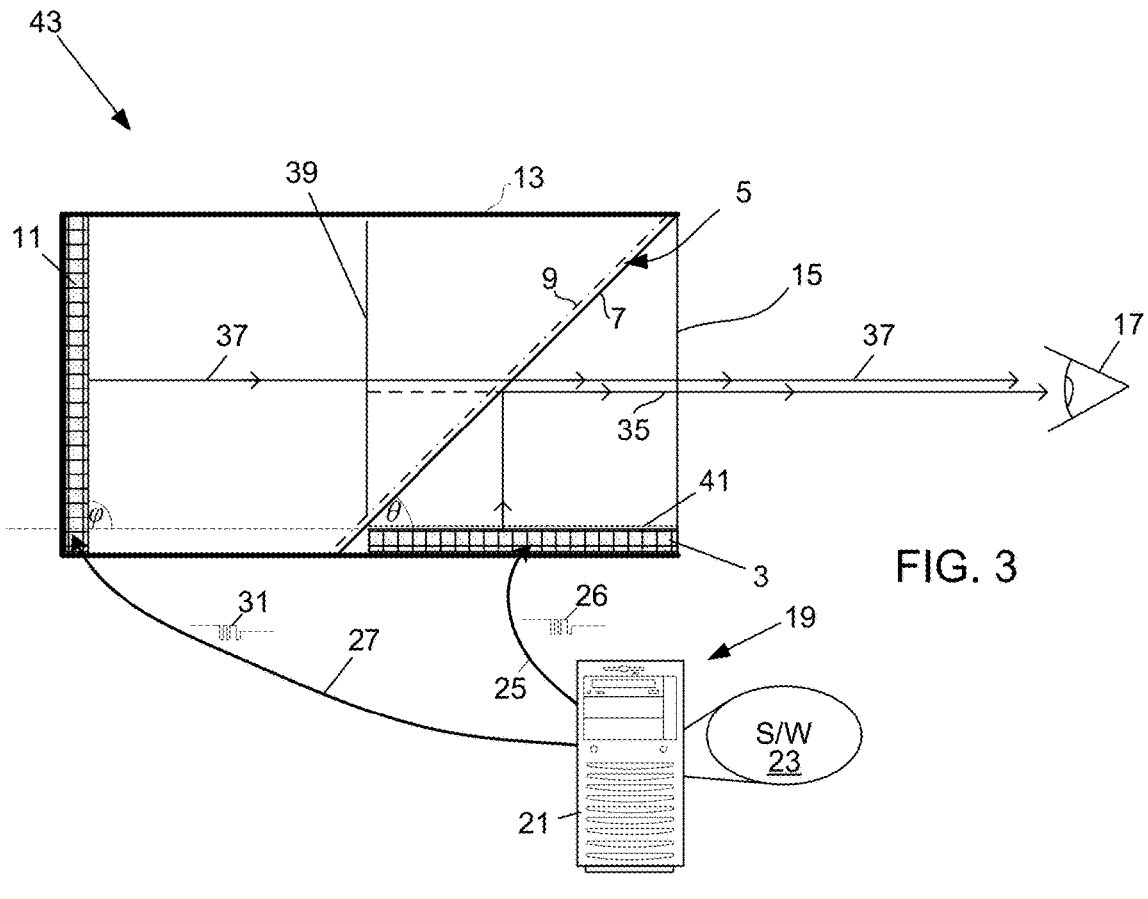
FIG. 3 is a cross-sectional side view of a first embodiment of a display assembly, in use, according to the present invention.

The Inventor decided to proceed by placing a privacy screen 41, such as a micro-louvre privacy screen available from 3M (https://www.3 m.com/3M/en_US/privacy-screen-protectors-us/retrieved 10 Jun. 2021) over the scene display screen 3 to arrive at display assembly 43 of FIG. 3, being a first embodiment of a display apparatus according to the present invention.

The Inventor found that the privacy screen 41 was effective in limiting the angular viewing range of the display screen 3 and so prevented the rays 34, 36 of FIG. 1 from being emitted so that the observer 17 could no longer directly see the moving scene image 33 on display screen 3 but rather could only see the virtual moving scene image 33v via the first reflection side 7 of the mirror 5.

Consequently, the display assembly 43 was a significant improvement over the early display assembly 1 of FIGS. 1 and 2 and a useful apparatus for producing a perception in observer 17 that virtual moving scene image 33v was a 3D object.

Although the display assembly 43 was an improvement over the early display assembly 1, due to the inclusion of the privacy screen 41 to prevent the unwanted direct viewing of the scene moving image 33 on the scene display screen 3, nevertheless the Inventor felt that improvements might be made to further assist in fostering an even better perception of a 3D object in the observer 17.

The Inventor realised that the presence of a shadow, cast by the virtual object 33v, would provide a further cue to the observer 17 to perceive that the virtual object was a real 3D object.

It would be possible to simply include a shadow in the moving image scene 33 displayed on the scene display screen 3. However, the Inventor realised that the apparent depth of the shadow and of the displayed object would be the same in that case, i.e., they would both be perceived to be on apparent plane 39 so that the shadow would not appear to be distanced from the object in 3D space.

Figure 5:
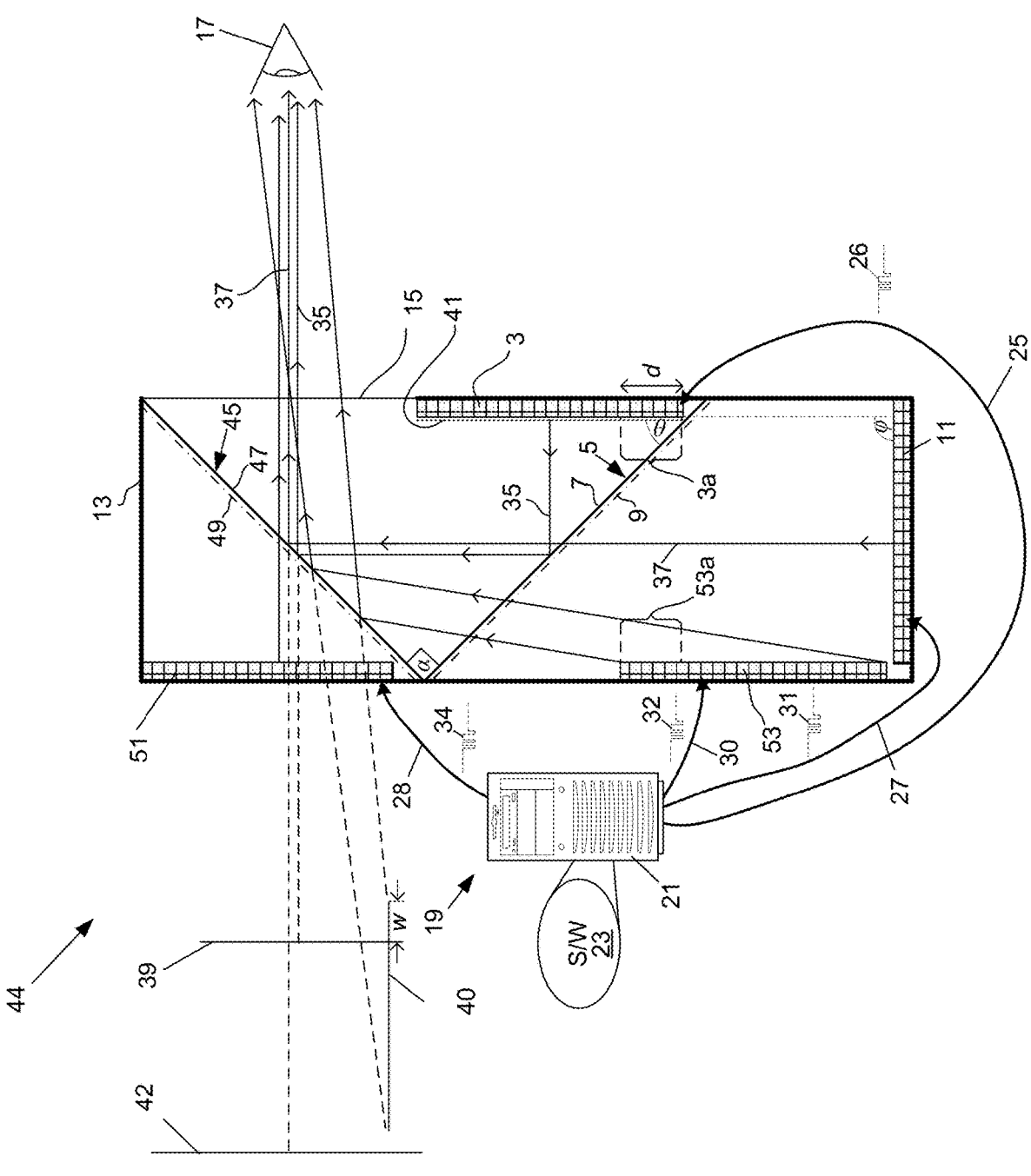
FIG. 5 is a cross-sectional side view of a preferred embodiment of a display assembly, in use, according to the present invention.

In order to address that problem, the Inventor, after much perseverance had a flash of inspiration and conceived the preferred display assembly 44 that is shown in FIG. 5.

Display assembly 44 includes a number of components that are common to the previously described display assembly 43 of FIG. 3 and so they are identified in FIG. 5 using the same identification numerals as in FIG. 3.

In addition to the first mirror 5, the display assembly 44 includes a second mirror 45 that has a reflection side 47 ("second reflection side") and a transmission side 49 ("second transmission side"). Like the first mirror 5, the second mirror 45 is partially silvered and preferably 70% reflective and 30% transmissive.

The second reflection side 47 is mounted at an angle α=90 degrees or thereabout to the first reflection side 7 so that when it is operating, the scene display screen 3 illuminates the first reflection side 7 of Mirror 5 and thence, by reflection from the first reflection side 7, the second reflection side 47 of second mirror 45. Consequently, the viewer 17, looking through opening 15 of housing 13, sees the scene display screen 3 via second reflection side 47 and first reflection side 7 as indicated by ray 35.

As was also the case for the earlier embodiment, display assembly 43 of FIG. 3, the background display screen 11 is mounted at an angle φ=90 degrees or thereabout to the scene display screen 3. The background display screen 11 faces the first transmission side 9 of the mirror 5 so that when the background display screen is operating it illuminates the first transmission side 9. Light from the background display screen 11, as indicated by ray 37, passes through the first transmission side 9 of the first mirror 5 and is then reflected from the second reflection side 47 of the second mirror 45 and thence out through opening 15 to the observer 17.

Display assembly 44 also includes a foreground display screen 51 that is located within housing 13 adjacent the second transmission side 49 so that it is on a side of the second mirror 45 that is opposite the opening 15 and is viewed by observer 17 through second mirror 45.

The image generation assembly 19 is coupled to the scene display screen 3, background display screen 11, foreground display screen 51 and shadow display screen 53, by respective video cables 25, 28, 27 and 30. The image generation assembly 19 may comprise the computer 21 that is programmed with software 23 for producing a moving scene image 33, a background image 28, a shadow image 29 and foreground image 27. Video cables 25, 28, 27 and 30 convey video signals 26, 34, 31 and 32 which correspond to the respective images for display on the screens. Whilst it is preferred that the foreground display screen be an active display, such as an electronic monitor or tv screen, it could be a painted image for example that is lit by a light source so that it is visible to the viewer.

The instructions that comprise the software product 23 include instructions for the one or more processors of the computer 21 to generate a three dimensional space containing a scene of one or more virtual objects, e.g. scene 33. Depending on the software techniques used the one or more virtual objects may be comprised of polygons, octrees or point cloud data for example. The software 23 also includes instructions for processors of computer 21 to manipulate the virtual scene by applying virtual lighting, surface texturing, transformation to a 2D viewing plane, which corresponds to scene display screen 3, and also rotations and translations of the objects making up the scene. Various techniques for producing and manipulating 3D scenes and projecting them onto a 2D viewing plane are known in the prior art, for example in the field of computer gaming, and are suitable for implementing the presently described embodiment of the invention.

Alternatively, in other embodiments the image generation assembly 19 may comprise a number of video or still image players that respectively play back pre-recorded video, or still images in the case of the background and foreground images, of a moving scene image 33, a background image

28, a shadow image 29 and foreground image 27. At least the video player that produces the moving scene image 33 and the video player that produces the shadow image 29 are synchronized.

The observer 17 views the background display screen 11 and the scene display screen 3 simultaneously through the opening 15 in the housing 13.

Observer 17 views the scene display screen 3 along ray 35 by reflection off the first mirror 5 and the second mirror 45 and consequently sees the virtual moving scene image 33v on scene apparent plane 39, located behind the second mirror 45 (relative to observer 17).

Observer 17 views the background display screen 11 due to transmission of light from the background display screen 11 along ray 37, through the first transmission side 9, of first mirror 4 and thence reflected by the second reflection side 47, of second mirror 45. Consequently, observer 17 sees the virtual background image 28a on background apparent plane 42, which appears to be behind the scene apparent plane 39.

The observer 17 also sees virtual shadow image 29v on a horizontal shadow apparent plane 40. An upper border of the shadow display screen 53 overlaps a lower border of the scene display screen 3 by a distance "d" so that the scene apparent plane 39 is inset a distance "w" from a closest border of the horizontal shadow apparent plane 40. Providing the overlap "d" to create the inset "w" assists in making the virtual moving scene image 33v to be creating the underlying virtual shadow image 29v and so further assists in creating the perception in the user that the virtual moving scene image 33v is of a 3D image and not a 2D image.

Figure 11:
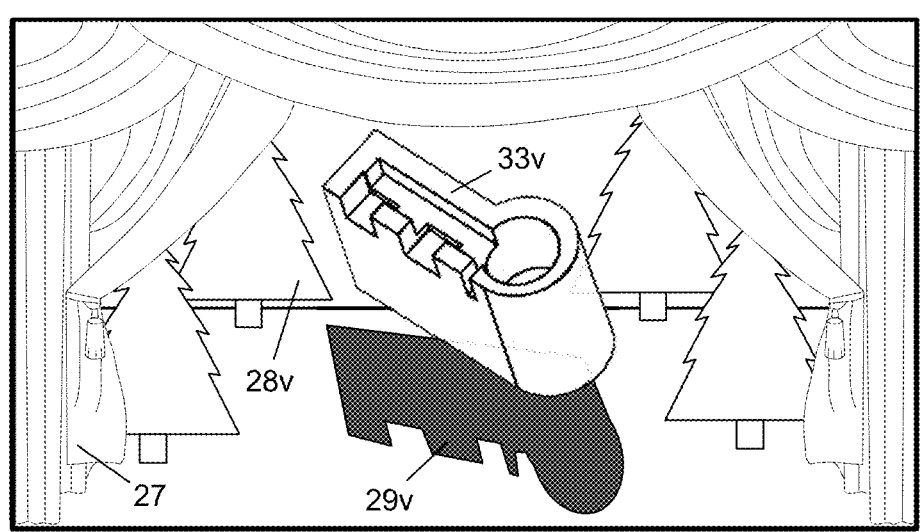
FIGS. 11 to 13 show a front view of the display assembly of FIG. 5 at use at progressive times to show the rotation of the moving scene image.
Figure 12:
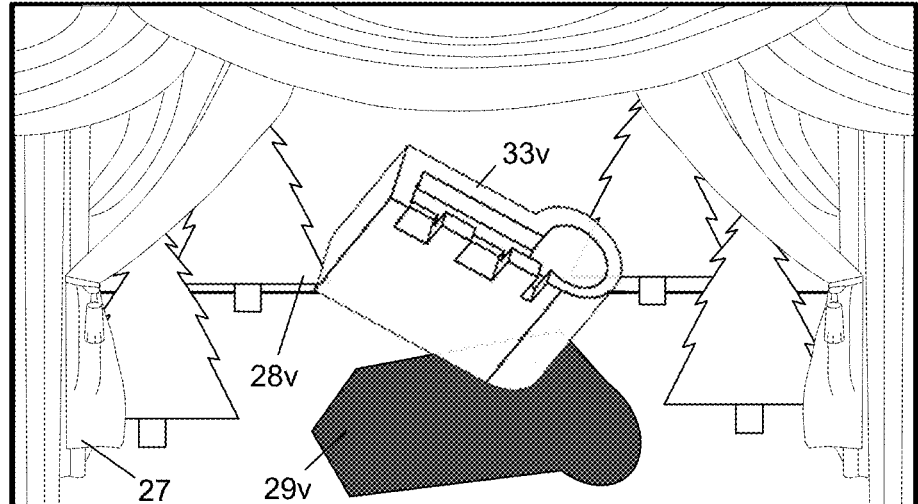
Figure 13:
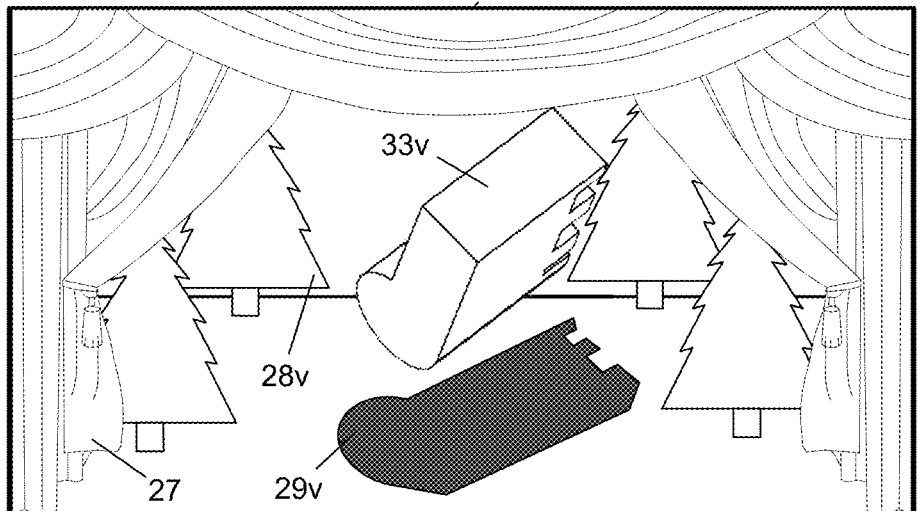

Preferably the moving scene image 33 comprises a scene that rotates at a frequency of between three to six times per second, or more preferably about 0.25 Hz (once every four seconds). FIGS. 11 to 13 depict progressive stages of rotation and show the synchronization of the virtual moving scene image 33v with the virtual shadow image 29v. The foreground image 27 and the background image 28v remain static in this example.

Figure 14:
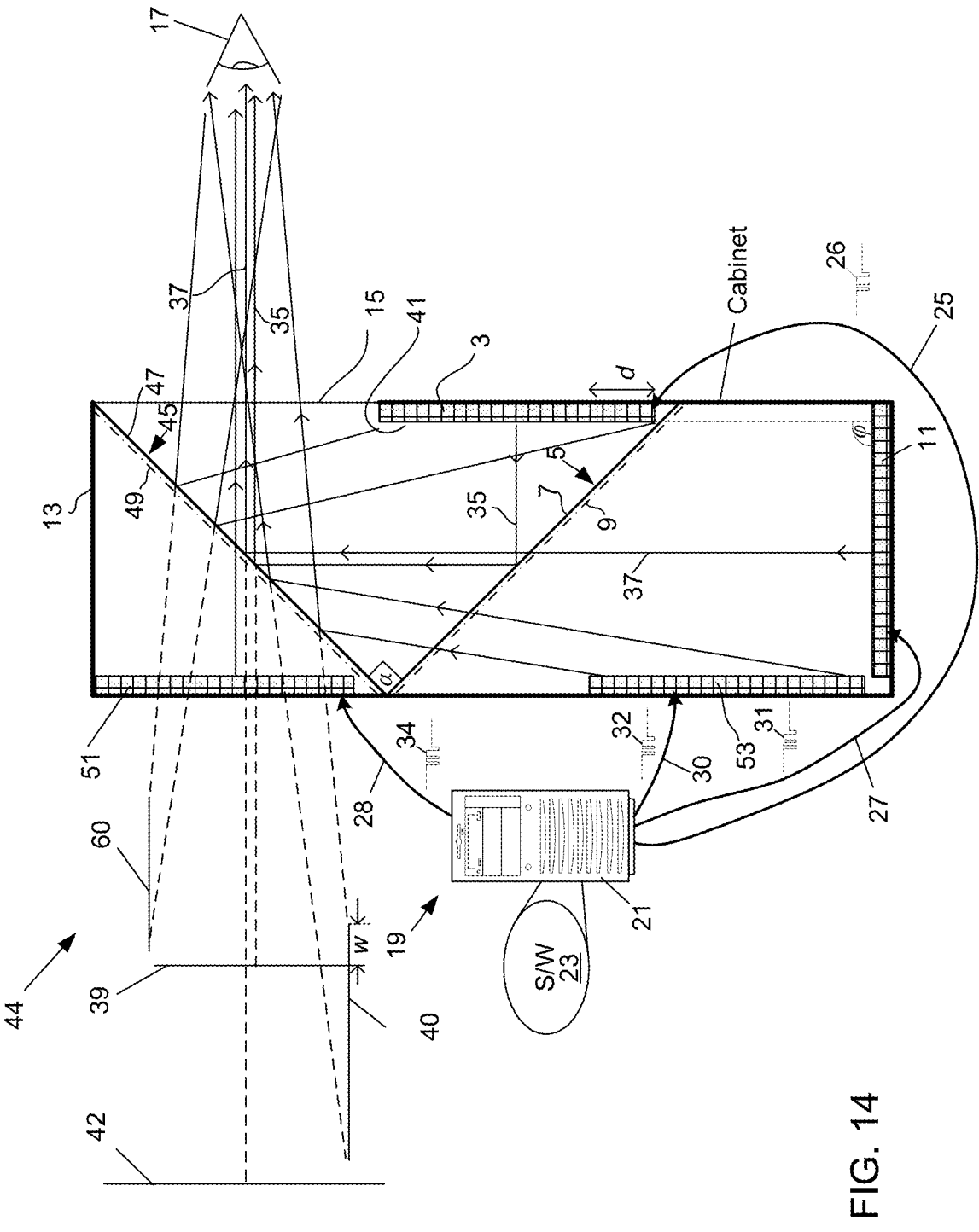
FIG. 14 shows a display assembly that is similar to the display assembly of FIG. 5 but which is absent a privacy screen over the scene display screen so that a secondary scene apparent plane is produced, which is undesirable.
Figure 15:
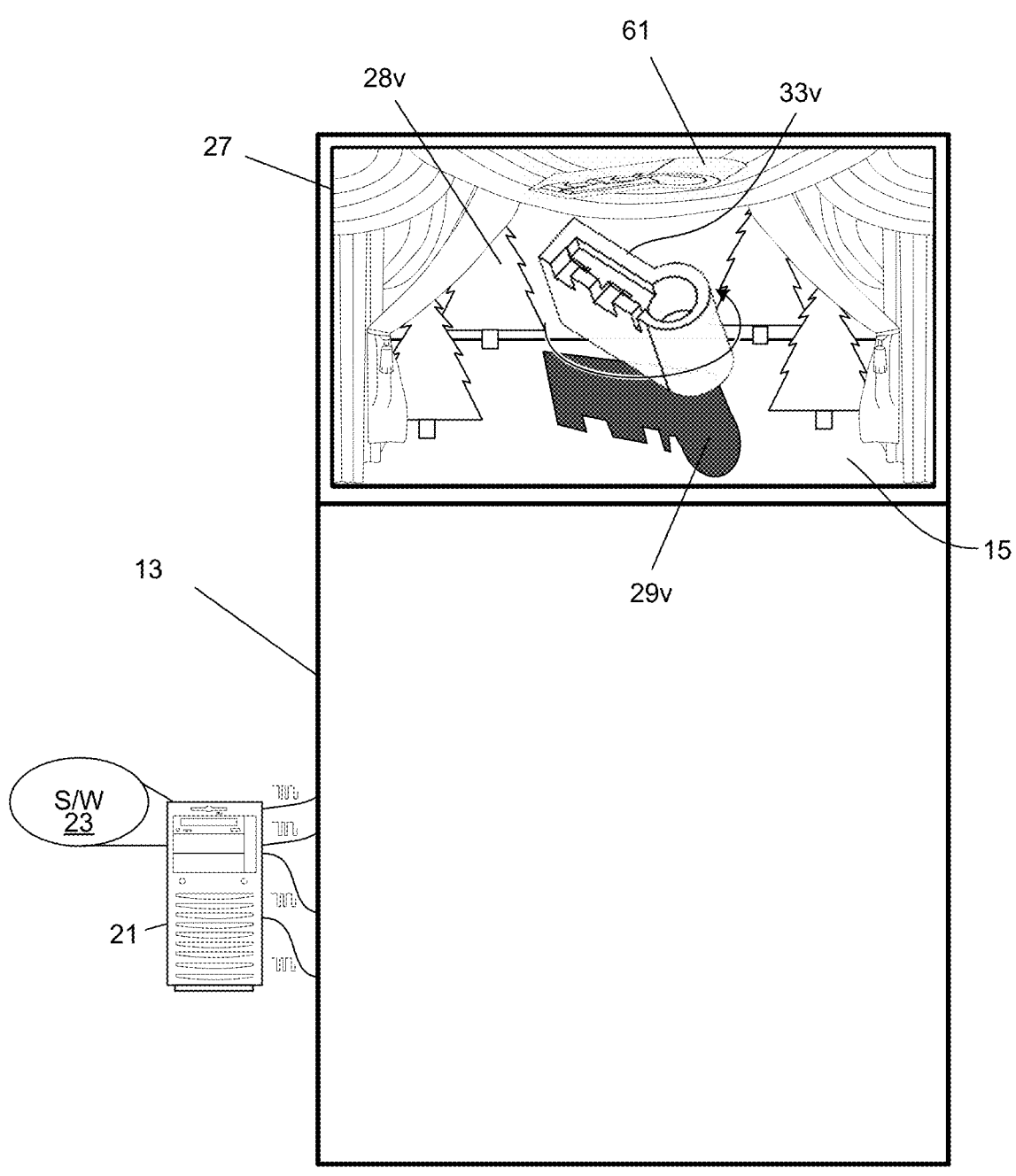
FIG. 15 is a front view of the display assembly of FIG. 14 in which the secondary scene image can be observed, which is undesirable.

FIG. 14 shows a display assembly that is similar to the display assembly of FIG. 5 but which is absent privacy screen 41 over the scene display screen 3. Consequently, a secondary scene apparent plane 60 is produced on which a secondary scene image 61 can be observed, as shown in FIG. 15, which is undesirable. Accordingly, a display assembly according to an embodiment of the present invention includes the privacy screen 41.

From the foregoing it will be realized that in one embodiment there is provided a display assembly 43, 44 that is designed to elicit a perception of a three-dimensional (3D) scene 33v, in an observer 17. The display assembly 43, 44 comprises a scene display screen 3 that has a privacy screen 41 mounted over it for reducing viewing angle of the display screen. The display assembly 43, 44 also includes a first mirror, which is a partially silvered mirror that has a reflection side 7 ("the first reflection side") and a transmission side 9 ("the first transmission side"). The first reflection side is mounted at an angle of θ=45 degrees or thereabout to the scene display screen 3 so that in use the scene display screen 3 directs rays of light at the first reflection side 7 so that it illuminates the first reflection side 7.

The display assembly 43, 44 also includes a background display screen 11 that is mounted at an angle of φ=90 degrees or thereabout to the scene display screen and which faces the first transmission side 9 of the first mirror 5 so that it illuminates the first transmission side with light from the screen.

A housing 13 is arranged about the scene display screen 3, background display screen 11 and first mirror 5 for reducing ambient light within the housing including an opening 15 for viewing of the reflection side 7 of the first mirror therethrough. The display assembly 43, 44 also includes an image generation assembly 19 that is coupled to the scene display screen 3 and to the background display screen 11 for producing a moving scene image 33 and a background image 28 thereon. In use an observer 17, or a number of observers simultaneously, views the background display screen and the scene display screen simultaneously when viewing the reflection side 7 of the first mirror 5. The privacy screen 41 prevents viewing by the observer of a secondary scene image, e.g. image 61 of FIG. 15 or a secondary image comprising a direct view of screen 3 as indicated by rays 36 and 34 in FIG. 1.

By " . . . degrees or thereabout" it is meant that the angle that is referred to could be up to a few degrees, such as three degrees more or three degrees less, than the specified number of degrees.

In one aspect there is provided a display assembly that includes at least one partially silvered mirror 5, 45, a background display screen 11 and a scene display screen 3. The background display screen is positioned to illuminate a transmission side 9, 49 of the mirror 5, 45 and the scene display screen 11 illuminates a reflection side 7, 47 of the mirror. Rays from the scene display screen 3 and the background display screen 11 are directed toward a viewing position, for example a viewing opening of the display assembly, for simultaneous viewing by an observer.

It will be realised from the foregoing that one aspect of the invention comprises a method for creating the perception of a three-dimensional scene from two-dimensional images. The method involves displaying a reflection of a 2D moving scene image, e.g., image 33 in FIG. 2, corresponding to the 3D object with a partially silvered mirror such as mirror 5. The method also includes displaying a background image, such as image 28, at a location behind the partially silvered mirror 5 for transmission of the background image 28 through the partially silvered mirror. A viewing range of the moving 2D display is limited, by using privacy screen 41, to prevent formation of a secondary image (e.g., image 61 of FIG. 15) of the moving 2D display.

The method may also comprise displaying a shadow image, such as image 29, corresponding to the moving 2D display, e.g. item 33, on a shadow display screen 53 and reflecting the shadow image, for example with second mirror 45 for viewing on an apparent plane 40 at ninety degrees to an apparent viewing plane 39 of the moving image scene 33.

The method may also involve displaying a foreground image in front of the moving scene image, for example with foreground image screen 51.

Figure 4:
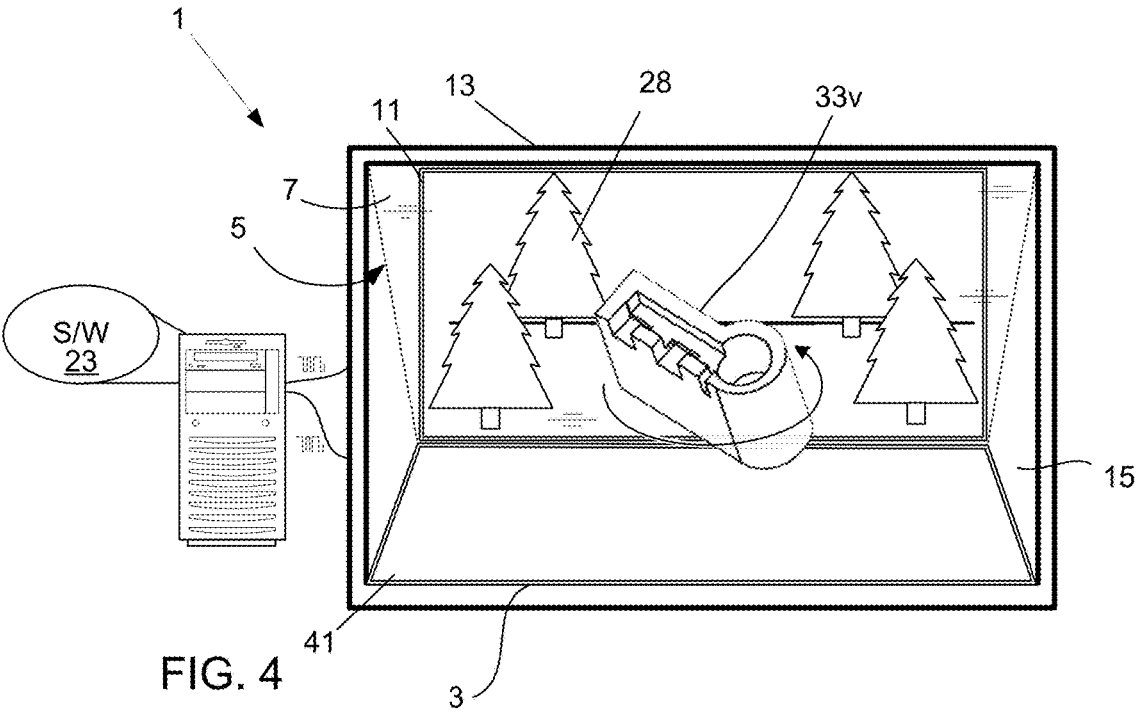
FIG. 4 is a front view of the display assembly of FIG. 3, in use.

It will be realized from the preceding that in an embodiment a display assembly is provided such as assembly 43 of FIGS. 3 and 4, for eliciting a perception of a three-dimensional (3D) scene in an observer 17, the display assembly includes a scene display screen 3 that has a privacy screen 41 mounted thereover for reducing viewing angle of the scene display screen 3. Assembly 43 also includes a first mirror 5, which may be referred to as "a partially silvered mirror", and which has a reflection side 7 ("the first reflection side") and a transmission side 9 ("the first transmission side"). The first reflection side 7 is mounted at 45 degrees, indicated as angle θ, or thereabout to the scene display screen 3 for illumination thereby.

Display assembly 44 also includes a background display screen 11, which is mounted at 90 degrees, indicated as angle φ, or thereabout to the scene display screen 3 and facing the first transmission side 9 for illumination thereof. A housing 13 is arranged about the scene display screen 3, background display screen 11 and first mirror 5 for reducing ambient light within the housing including an opening 15 for viewing of the reflection side 7 of the first mirror 5 therethrough, either directly in the case of the embodiment of display assembly 43 or via a second mirror 45 in the case of the embodiment 44 of FIG. 5. Assembly 43 also includes an image generation assembly 19, which is coupled to the scene display screen 3 for producing a moving scene image 33 thereon. In use the observer 17] views the background display screen 11 and the scene display screen 3 simultaneously when viewing the reflection side 7 of the first mirror 5 to thereby observe a virtual moving scene image 33v. The privacy screen 41 prevents viewing by the observer 17 of a secondary scene image in the form of the moving scene image 33.

Figures 6, 7, 8, 9:
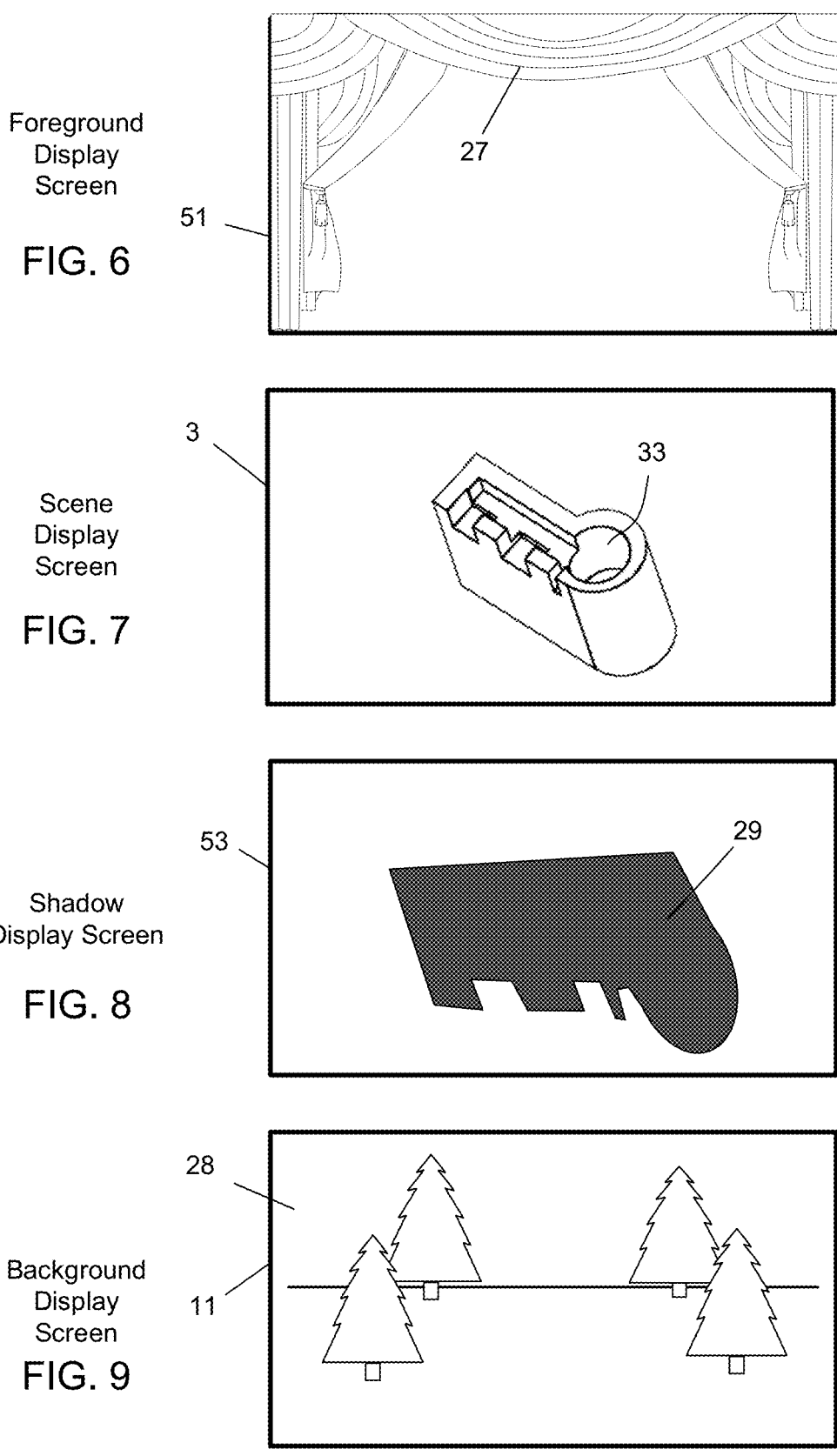
FIG. 6 shows a foreground display screen of the embodiment of FIG. 5 in use and presenting (i.e. "displaying") a foreground image.
FIG. 7 shows a scene display screen of the embodiment of FIG. 5 in use and presenting a moving scene image.
FIG. 8 shows a shadow display screen of the embodiment of FIG. 5 in use and presenting a shadow image corresponding to the moving scene image.
FIG. 9 shows a background display screen in use and presenting a background image.
Figure 10:
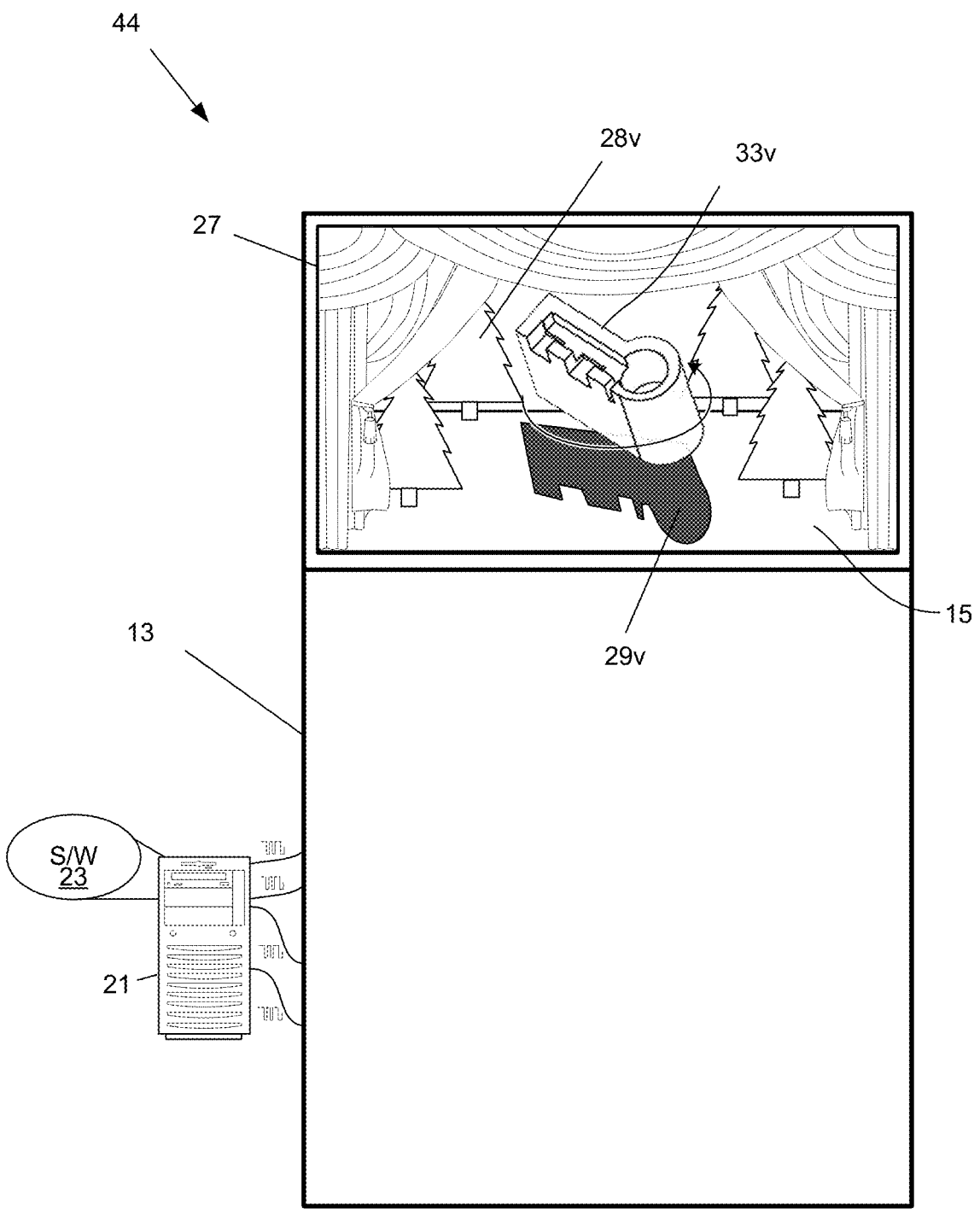
FIG. 10 is a front view of the display assembly of FIG. 5 in use.

In an embodiment, for example the display assembly 44 illustrated in FIGS. 5 and 10, the display assembly 44 includes a second mirror 45 which has a reflection side 47 ("second reflection side") and a transmission side 49 ("second transmission side"). The second reflection side 47 is mounted at 90 degrees, indicated as angle α, or thereabout to the first reflection side 7. The display assembly 44 of this embodiment includes a shadow display screen 53 that is mounted opposite the scene display screen 3. An edge portion 53a of the shadow display screen 53 overlaps an edge portion 3a of the scene display screen 3. The shadow display screen 53 is located adjacent the first transmission side 9 of the first mirror 5. The image generation assembly 19 is configured to produce a shadow image 29 (FIG. 8) which the observer 17 sees via the second reflective side 47 of the second mirror 45 as a virtual shadow image 29v which moves in correspondence to the virtual moving scene image 33v.

The display assembly 44 also includes a foreground display screen 51 that is located adjacent the second transmission side 49 of the second mirror 45. The image generation assembly 19 is configured to produce a foreground image 27 for display by the foreground display screen. The virtual moving scene image 33v is preferably generated by the image generation assembly 19 to appear to rotate at a frequency of between three to six times per second and most preferably at a frequency of four times per second.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the scope of the invention.

The invention claimed is:

1. A display assembly for eliciting a perception of a three-dimensional (3D) scene in an observer, the display assembly comprising:
   a scene display screen;
   a privacy screen mounted over the scene display screen for reducing viewing angle thereof;
   a first mirror having a reflection side as a first reflection side and a transmission side as a first transmission side, the first reflection side mounted at an angle to the scene display screen for illumination thereby;
   a background display screen facing the first transmission side for illumination thereof;
   a second mirror having a reflection side as a second reflection side and a transmission side as a second transmission side, wherein the second reflection side reflects light transmitted through the first transmission side from the background display screen through the opening for viewing of the background display screen by the observer;
   a shadow display screen, wherein the shadow display screen is located adjacent the first transmission side;
   a housing arranged about the scene display screen, the background display screen and the first mirror for reducing ambient light within the housing including an opening for viewing of the reflection side of the first mirror therethrough; and
   an image generation assembly coupled to the scene display screen for producing a moving scene image thereon;
   wherein the image generation assembly is configured to produce a shadow image on the shadow display screen wherein the shadow image corresponds to a shadow of the moving scene image; and
   wherein the display assembly is configured such that the observer views the background display screen and the scene display screen simultaneously when viewing the reflection side of the first mirror and wherein the privacy screen prevents viewing by the observer of a secondary scene image.

2. The display assembly of claim 1, wherein the first reflection side is mounted at 45±3 degrees to the scene display screen.

3. The display assembly of claim 1, wherein the background display screen is mounted at 90±3 degrees to the scene display screen.

4. The display assembly of claim 1, wherein the second reflection side is mounted at 90±3 degrees to the first reflection side.

5. The display assembly of claim 1, wherein the shadow display screen is mounted opposite the scene display screen.

6. The display assembly of claim 5, wherein an edge portion of the shadow display screen overlaps an edge portion of the scene display screen.

7. The display assembly of claim 1, wherein the display assembly includes a foreground display screen.

8. The display assembly of claim 7, wherein the foreground display screen is located adjacent the second transmission side.

9. The display assembly of claim 7, wherein the image generation assembly is configured to produce a foreground image for display by the foreground display screen.

10. A display assembly for eliciting a perception of a three-dimensional (3D) scene in an observer, the display assembly comprising:
   a scene display screen;
   a privacy screen mounted over the scene display screen for reducing viewing angle thereof;
   a first mirror having a reflection side as a first reflection side and a transmission side as a first transmission side, the first reflection side mounted at an angle to the scene display screen for illumination thereby;
   a background display screen facing the first transmission side for illumination thereof;
   a housing arranged about the scene display screen, background display screen and first mirror for reducing ambient light within the housing including an opening for viewing of the reflection side of the first mirror therethrough; and
   an image generation assembly coupled to the scene display screen for producing a moving scene image thereon;
   wherein the observer views the background display screen and the scene display screen simultaneously when viewing the reflection side of the first mirror and wherein the privacy screen prevents viewing by the observer of a secondary scene image, and
   wherein the moving scene image rotates at a frequency of between three to six times per second.

11. The display assembly of claim 10, wherein the moving scene image rotates at a frequency of four times per second.

12. A method for creating a perception of a 3D object in an observer, the method comprising:
   displaying to the observer a reflection of a 2D moving scene image corresponding to the 3D object with a reflective side of a partially silvered mirror;
   displaying a background image at a location behind the partially silvered mirror, relative to the observer;
   wherein the background image is transmitted through a transmission side of the partially silvered mirror to the observer;
   displaying a shadow image corresponding to the moving 2D display on a shadow display screen and reflecting the shadow image for viewing on an apparent plane at ninety degrees to an apparent viewing plane of the moving scene image; and
   limiting the viewing range of the observer to see the moving 2D display to thereby prevent formation of a secondary image of the moving 2D display.

13. The method of claim 12, including displaying a foreground image in front of the moving scene image.

14. The display assembly of claim 1, wherein the moving scene image rotates at a frequency of between three to six times per second.

15. The display assembly of claim 10, wherein the moving scene image rotates at a frequency of four times per second.

* * * * *